United States Patent
Campbell et al.

[15] 3,678,875
[45] July 25, 1972

[54] TRIMMING PIPE SYSTEM FOR FREE-FLOWING CARGOES

[72] Inventors: George Thomas Richardson Campbell; Kimio Ohta, both of Tokyo, Japan

[73] Assignee: Algoship International Limited, Nassau, Bahamas

[22] Filed: June 25, 1970

[21] Appl. No.: 49,734

[30] Foreign Application Priority Data

April 24, 1970 Canada...................................19749/70

[52] U.S. Cl..................................................................114/73
[51] Int. Cl.............................................................B63b 25/08
[58] Field of Search..................................114/73, 72; 214/15

[56] References Cited

UNITED STATES PATENTS 2,895,444 7/1959 Mege.........................................114/73

FOREIGN PATENTS OR APPLICATIONS 1,263,996 5/1961 France......................................114/73

Primary Examiner—Trygve M. Blix
Attorney—Fetherstonhaugh and Co.

[57] ABSTRACT

A cargo vessel adapted for the carriage of free-flowing cargo loaded through hatch opening and a series of open ended cargo trimming pipes extending from the walls of the hatches and into the holds of the vessel at points remote from the cargo hatches, the cargo trimming pipes form structural members for the support of the hatch coamings and upper wing tanks through which the trimming pipes pass.

11 Claims, 8 Drawing Figures

Patented July 25, 1972　　3,678,875

INVENTORS
G. T. R. CAMPBELL
Kimio OHTA

Fetherstonhaugh & Co
PATENT AGENTS

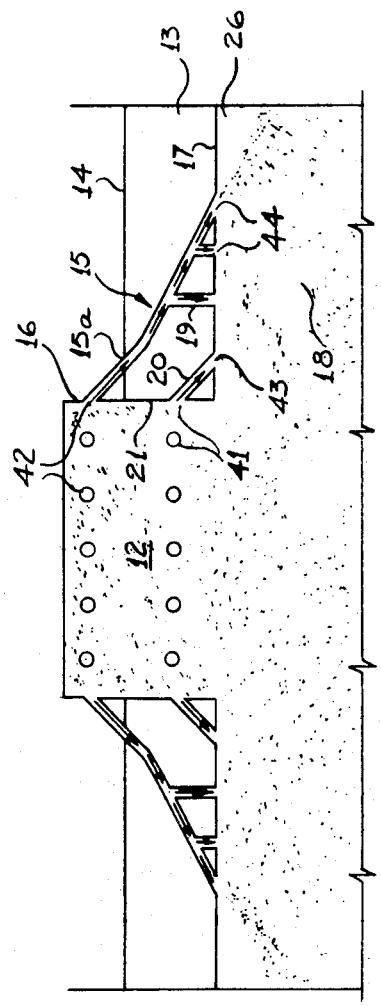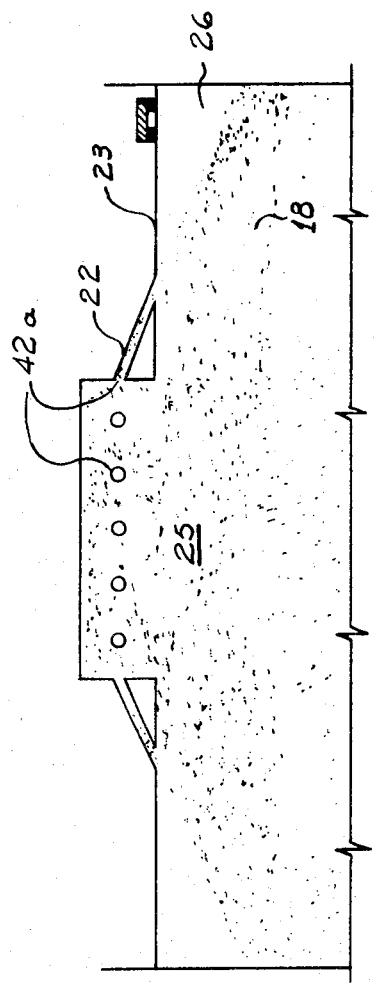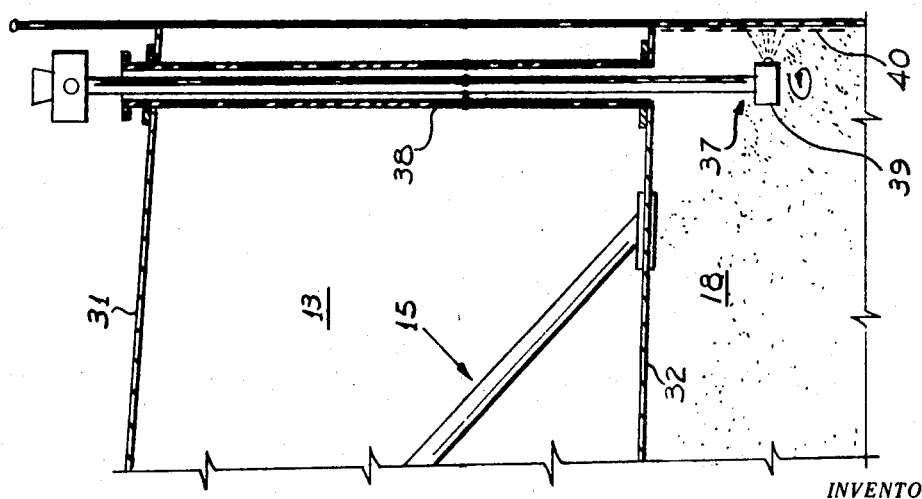

INVENTORS
G. T. R. CAMPBELL
Kimio OHTA

PATENT AGENTS

TRIMMING PIPE SYSTEM FOR FREE-FLOWING CARGOES

This invention relates to the stowage of free-flowing cargoes in ships and particularly to apparatus whereby the free-flowing cargo is caused to fill a maximum of space under the deck of the ship.

The invention is particularly applicable for use in multi-purpose dry cargo vessels built for carrying different types of cargo, such as automobiles, containers, general cargo, timber, etc. For such vessels to be efficient and economical, two fundamental requirements are essential, namely, that the construction of the hull be simple and structurally efficient and that the volume of the hold be as large as possible. Almost all self-trimming conventional dry bulk carriers and multi-purpose vessels are fitted with port and starboard topside wing tanks with the bottom of the tanks inclined at an angle of approximately 30° to the horizontal in order to avoid trimming of the cargo and to minimize the shifting of grain and other lightweight dry cargoes horizontally in each hold. This sloped construction of the wing tanks when incorporated in the construction of the holds on conventional vessels entails some disadvantages, the major of which are as follows:

a. The shape of the transverse section of the holds of the vessel does not permit the most effective use of steel as strength members.
b. The construction of the topside tanks is complicated.
c. The space occupied by the sloped section of the topside tanks below the longitudinal hatch girders reduces the available cargo cubic within the cargo holds. This loss of cargo cubic is very substantial on vessels having small area hatch openings.
d. Considerable broken stowage occurs in the upper part of the cargo holds when used for the carriage of package freight, lumber, newsprint, etc. because of the sloped under surface of the wing tanks. The cost of stowage and securing of such cargo under the sloped wing tanks is also greatly increased.
e. When vessels having such wing tanks are engaged in the automobile and container trades, the loss of usable cubic capacity occasioned by the sloped construction is even greater.

Though the main purpose in providing the sloped upper wing tanks has been to avoid trimming of grain cargoes, when engaged in light grain cargoes the loss of cubic capacity resulting from this construction reduces the tonnage of such cargoes carried.

Some conventional vessels have been provided with grain feeder hatches on the upper deck at the side of the main hatches and in between hatches, instead of the sloped upper wing tanks. When loading grain with this arrangement, the grain loading machine must be stopped and the feeding pipe of the machine shifted from the main hatch opening to the feeder hatch opening. This is a time consuming operation resulting in increased loading time and cost of loading. Also, in several ports the outreach of the grain loading machines is limited with the result that the grain cannot be loaded through the feeder hatches furthest away from the loading machine and the vessel must be turned around in order to complete loading with further attendant additional cost.

It is therefore apparent that in both types of construction, upper wing tanks and side feeder hatches, there is considerable restriction in the cargo carrying features and earning capacity of these vessels.

The present invention, by embodying a simple grain loading arrangement, permits the application of the most efficient use of the structural steel when applied to vessels having single upper decks or alternatively rectangular upper wing tanks and obtains the maximum cubic capacity without the attending disadvantages described above.

This invention calls for the use of trimming pipes, one end of which is open to the main loading hatch and the other open end of which is open to the cargo hold below the overhanging deck. These trimming pipes penetrate the upper deck or the top surface wall of the rectangular upper wing tanks at a predetermined angle and project to the main hatch coamings so that grain filling the main hatch will flow down through the trimming pipes to the outermost sides of the hold. In the intermediate length of the trimming pipes, vertical down-drop branch pipes may be fitted to assist in the full loading and trimming of the hold below. Where the trimming pipes pass through the rectangular upper wing tanks, auxiliary trimming pipes may be installed from the side wall of the tanks firming the hatch wall below the upper deck level.

The trimming pipes, in addition to being installed transversely of the vessel, can also be installed longitudinally of the vessel in order to feed grain into the fore and aft portions of the hold bay and the hatch opening.

In order to check on the trim of the grain under the deck, use can be made of a periscope inserted through the deck and the upper wing tanks. This periscope can be equipped with a light and, when directed towards the side of the vessel or bulkheads, it can be observed how the trimming is taking place. The inside surface of the side of the vessel or bulkheads can be painted with identifiable level markings which can be observed through the periscope.

It is, therefore, a primary object of the invention to install a series of grain trimming pipes between the hatches of a vessel and the area of the holds beyond the hatches.

A further object of this invention is to provide a dry bulk carrier vessel in which the upper wing tanks have a rectangular configuration through which cargo trimming pipes pass from the loading hatches to the hold.

A further object of the invention is to provide a series of cargo trimming pipes between the loading hatches and remote portions of the hold of a vessel.

A further object of the invention is to provide cargo trimming pipes which form structural members between the decks of the vessel and the walls and coamings of the loading hatches.

The object and advantages of the invention will be apparent from the following detailed specification and the accompanying drawings in which:

FIG. 3 is a transverse section of a vessel having rectangular upper wing tanks and showing the grain trimming pipe system of the present invention.

FIG. 4 is a view similar to FIG. 3 but showing a vessel without upper wing tanks.

FIG. 8 is an enlarged partial sectional view showing periscope means for viewing the ullage below and upper wing tank.

Figure 1:
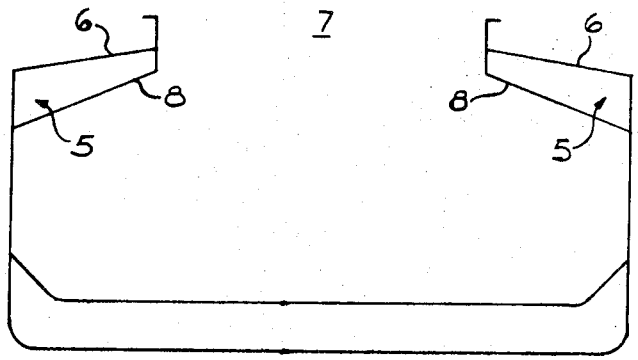
FIG. 1 is a transverse section of a single deck vessel having upper wing tanks with self-trimming under surfaces.
Figure 2:
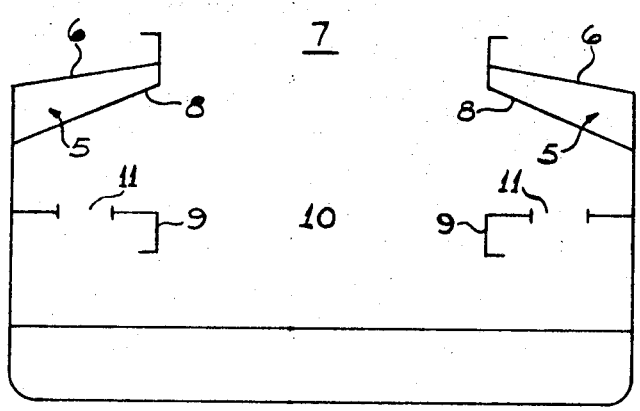
FIG. 2 is a transverse section of a vessel similar to FIG. 1 with an additional tween-deck and hatch opening.

Referring to the drawings and particularly to FIGS. 1 and 2. These two figures illustrate conventional transverse sections of vessels used for the carriage of bulk dry cargo. In FIG. 1 there is illustrated a single deck vessel having upper wing tanks 5 under the deck 6, and a cargo feeder hatch 7. The lower surface 8 of the wing tanks is angled in order to provide a degree of self-trimming of the cargo loaded through the hatch 7. In FIG. 2 there is illustrated a vessel similar to that shown in FIG. 1 but having a lower deck 9 and a hatch opening 10. In order to provide for faster loading of the hold under the deck 9 this deck is provided with feeder hatches 11. Where the vessel is not provided with wing tanks as shown at 5 feeder hatches may be provided through the deck 6.

Referring now to FIG. 3, the vessel shown has a cargo loading hatch 12 and rectangular wing tanks 13 under the deck 14.

A series of cargo trimming pipes 15, open at both ends, extend from the hatch coaming 16, down through the deck 14 and through the wing tanks 13 to open through the bottom wall 17 of the wing tanks and into the hold 18. The diameter of the pipes 15 need not be large, about 4 inches in diameter has been found satisfactory, as the angle at which the pipes are set will ensure forerunning of the cargo through them from the hatch to the hold.

In order that the cargo will spread to a maximum under the bottom wall 17 of the wing tanks, additional down feeder branch pipes 19 can be fitted between the pipes 15 through the bottom wall 17.

The portion 15a of the pipes 15 between the hatch coaming 16 and the deck 14 serve as support stanchions for the hatch coaming, taking the place of the stanchions normally fitted.

Also in FIG. 3 there is shown auxiliary trimming pipes 20 extending from the lower portion of the hatch side walls 21 and opening through the bottom wall 17 of the wing tanks 13.

In FIG. 4 there is shown a vessel without upper wing tanks. In such a vessel the trimming pipes 22 are located between the hatch coaming 16 and the deck 23 and permits the loading and trimming of the cargo up to the level of the deck 23 in the area beyond the side walls 24 of the hatch 25.

In both FIGS. 3 and 4 the ullage space 26 is kept to a minimum and with normal movement of the vessel riding in the water this ullage space will be further reduced as the cargo will flow through the trimming pipes to the hold with continual topping of the cargo in the hatches.

Figure 5:
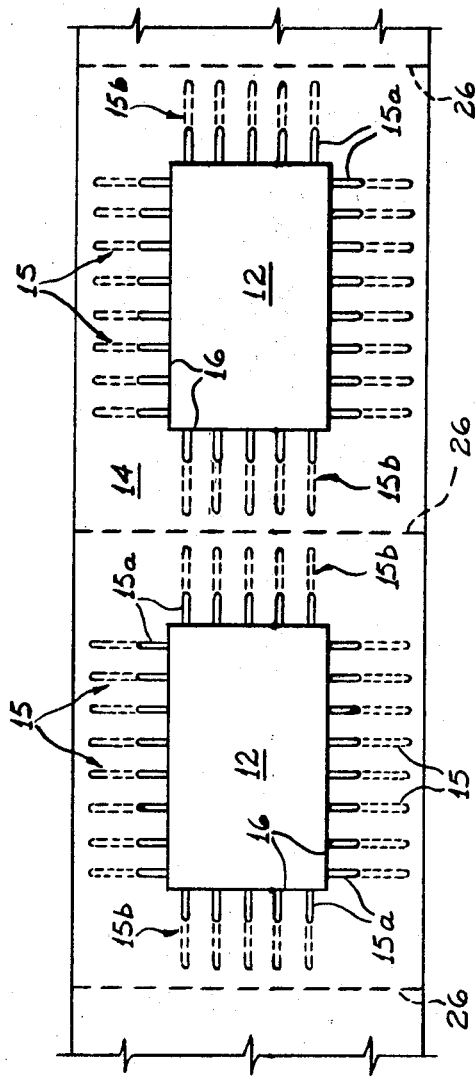
FIG. 5 is a partial longitudinal deck plan view showing the transverse and longitudinal arrangement of trimming pipes shown in FIG. 3.

While the trimming pipes shown in FIGS. 3 and 4 are shown directed to the hold to port and starboard of the vessel, it is to be understood that trimming pipes can also be directed from the hatches both forward and aft in order to trim the cargo against the transverse bulkheads 26 (FIG. 5) of the holds. In FIG. 5, which is a partial longitudinal deck plan view, there is shown the transverse trimming pipes 15 of FIG. 3 and corresponding longitudinal trimming pipes 15b.

Figure 6:
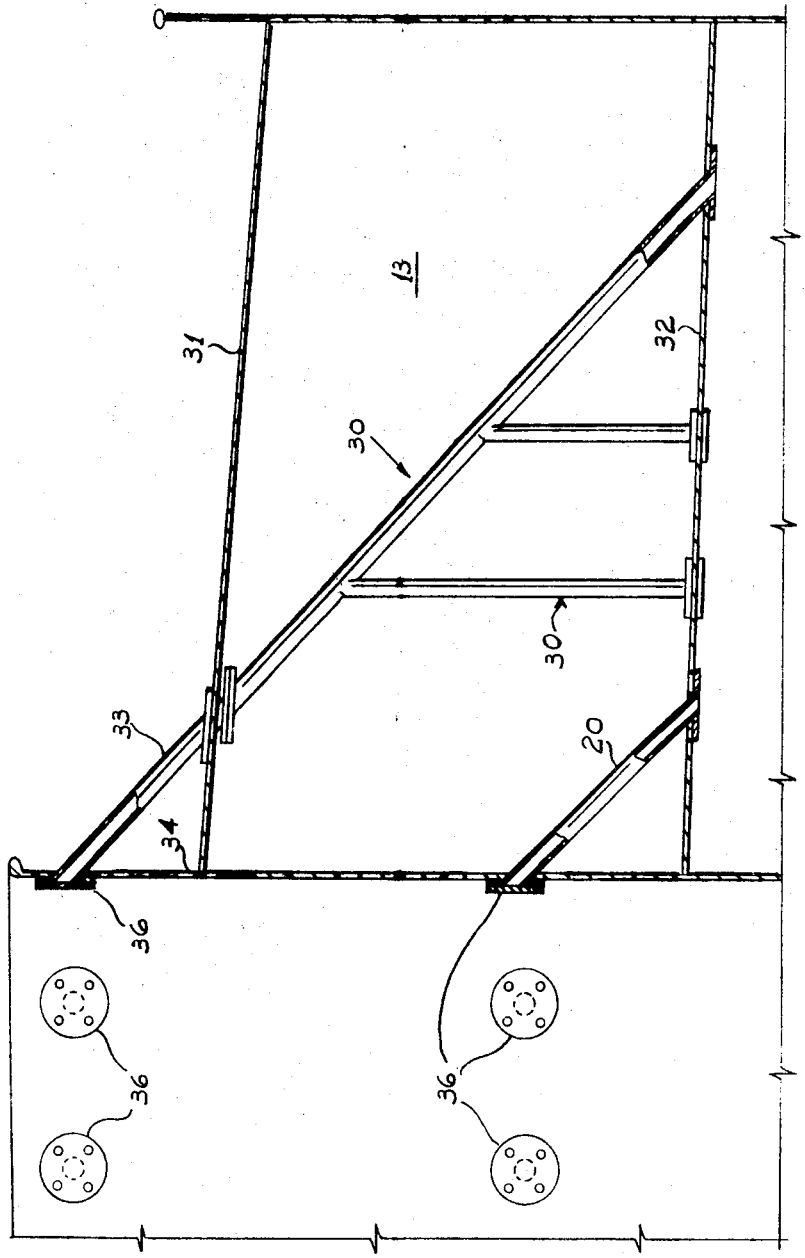
FIG. 6 is an enlarged partial sectional view of a removable trimming pipe for installation within the upper wing tanks.

Due to the internal frame construction of the vessel where the structural members tend to interfere with the trimming of the cargo in the area immediately under the deck or under the upper wing tanks, the trimming pipes should preferably be located between each frame. However, in certain cases it may be sufficient to locate the trimming pipes between every second frame.

Where the vessel is designed to use the space taken up by the upper wing tanks 13 as shown in FIG. 3 as a cargo carrying space, that portion of the trimming pipes within this space can be made removable in the manner shown in FIG. 6.

In FIG. 6 the trimming pipe 30 is preferably of all welded construction. That portion 33 of the trimming pipe 30 between the hatch coaming 34 and the deck 31 is a permanent fixture and is made watertight at both coaming and deck, and acts as a stanchion as previously described. Where the rectangular wing tanks 13 are, on occaisions, to be used for the carriage of general cargo, the trimming pipes 30 can be made removable with watertight connections to the decks 31 and 32. Instead of all welded trimming pipes 30, These pipes may be made in sections with flanged connections if considered more convenient.

A cover plate 36 is provided to seal off the upper ends of the trimming pipes 15, 20, 22 and 30 from entry of foreign matter from the hatch when the trimming pipes are not in use for loading of the cargo. Similarly, all openings in the deck 32 (FIG. 6) are sealed off when the trimming pipes 30 between the decks 31 and 32 are not being used.

Figure 7:
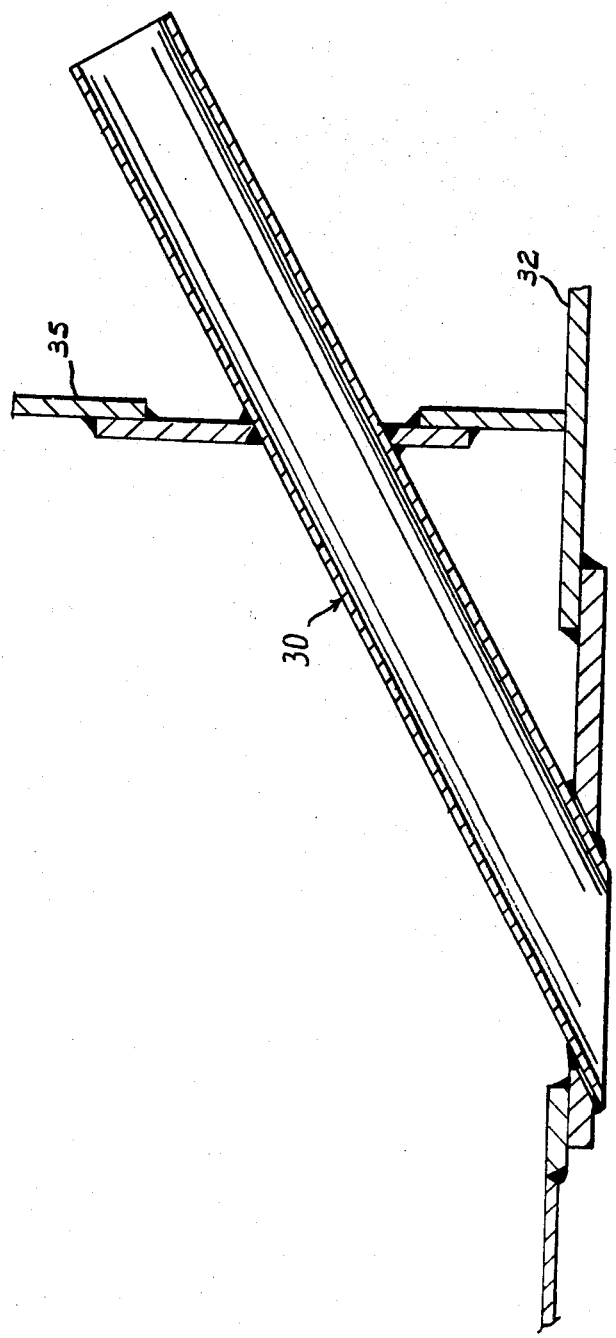
FIG. 7 is an enlarged detail of a portion of a trimming pipe watertight connection to the deck and through a vertical bulkhead.

In FIG. 7 there is shown in detail a method for water-tight filling of the trimming pipes to decks or bulkheads. The bulkhead 35, shown in FIG. 7, can divide the rectangular wing tank 13 (FIG. 6) to provide separate a ventilating and piping conduit and a ballast tank in well known manner.

FIG. 8 shows the use of a portable periscope device for checking the trimming of the cargo in the hold and the ullage which could still be profitably used. The periscope device 37 is lowered down through the stand pipe 38 fitted through the decks 31 and 32. The head 39 of the periscope is fitted with a light which can be projected onto the adjacent side of the hold or bulkhead to pick up colored markings 40 and the level of the cargo. The top of the stand pipe 38 is provided with a seal cover when not in use.

In the operation of this invention for loading free-flowing cargoes in vessels, the cargo is directed by the cargo loading machine, spouts in the case of grain, directly into the open hatches 12 in the usual manner and the operation is carried on until the cargo fills up in the hatch opening.

As the cargo reaches the level of the openings 41 and 42 of the trimming pipes 20 and 15 (FIG. 3), it will start to flow through these pipes down into the area of the hold bay and the periphery of the hatches, and will build up in these areas not reached by the normal gravity inclination of the cargo flow at the periphery of the hatches.

The cargo being loaded will continue to flow through the trimming pipes so long as there is a void in the hold to be filled under the lower open ends 43 and 44 of the pipes and, as the cargo continues to flow through the pipes from the hatches, the hatches can be topped until it is obvious that no further flow through the pipes is obtainable.

For maximum efficiency, the angle of inclination of the trimming pipes from the horizontal should not be less than 30°. In most cases, the angle of inclination of the trimming pipes will be determined by what is most suitable for the type of cargo generally carried by the vessel.

A constant check on the ullage below the deck level 17 in FIG. 3 or 23 in FIG. 4 can be made by means of the periscope arrangement shown in FIG. 7. The periscope head 39 can be equipped with a light for projection towards the colored strips 40 on the side of the hold, each of which represents a predetermined depth in the hold below the level of the deck 32.

By means of the portable periscope 37, lowered down through the stand pipes 38, it can readily be determined if the cargo is running freely into the hold and is filling up the void under the deck or wing tanks. To be most effective, it is advisable that the stand pipes 38 be located at positions as remote as possible from the hatch openings.

The periscope 37 will be trained to sight the gauge markings 40 on bulkhead walls or the side of the hold, the height of the cargo against the gauge markings indicating how the void under the deck is being filled.

In the event that the cargo becomes damp to the extent that it does not run freely through the trimming pipes, a plug type push rod can readily be inserted into the trimming pipes through their upper open end to thus clear the pipes of adhering cargo.

In the case of single deck vessels, such as is shown in FIG. 4, small inspection openings 43 can be fitted in the deck 23. These inspection openings will take the place of the stand pipes 38 and can be used in association with a portable light to sight the cargo loading in the void under the deck in the same manner as with the periscope 37.

The trimming pipes will generally be located between the transfer frames of the vessel and between longitudinal girders and will, therefore, assist in filling the spaces between such frames and girders, spaces which hitherto were often unfilled.

With the above described method of trimming free-flowing cargo the use of manual labor can be eliminated. The amount of cargo loaded into the hold and filling any voids under the deck or wing tanks can be accurately calculated to within about 3 percent. The time required to fill the hold can also be estimated closely, and these factors will be considered in determining the size and number of cargo trimming pipes to be fitted into a particular vessel.

A particular advantage of the use of cargo trimming pipes as above described is that it is no longer necessary to construct sloped bottoms to upper wing tanks in order to obtain self-trimming of grain or other free-flowing cargoes. The upper wing tanks can be constructed as rectangles as shown in FIG. 3. This lends itself to reducing the cost of construction of the vessel in addition to greatly adding to the strength of the vessel. In addition, the upper wing tanks as shown in FIG. 3 can be used to stow bulk package cargo if desired by merely removing the sections of the trimming pipes within the wing tanks 13 and fitting blind flanges over the openings exposed.

The cargo cubic capacity of dry bulk carriers and similar vessels of the same geometric dimensions can be increased by about 8% with the use of the above described trimming pipes without sacrificing the other features of such vessels.

It will be appreciated that the use of cargo trimming pipes as above described will be of particular advantage where grain is the cargo being carried. However, the invention will be equally valuable for the carriage of many other types of free-flowing cargoes.

The use of the present invention eliminates the construction of sloped bottoms to upper wing tanks as previously required in order to obtain self-trimming of grain cargoes and other free-flowing cargoes.

The cargo capacity of dry bulk carriers and similar vessels can be of the same geometric dimensions, is increased by approximately 8 percent, without sacrificing the other features of such vessels.

The slack grain spaces within the cargo holds are reduced and the grain stability of the vessel is increased without hand trimming when the above described system is provided. This also occurs if the system is provided in the forward and after ends of existing vessels having sloping wing tanks.

The extent of use of grain shifting boards required in a vessel to obtain grain stability may be reduced and in some cases, grain shifting boards may be eliminated by the application of the above described system. In addition, the provision of grain trimming hatches can be eliminated, and the time required to load grain and similar cargoes may be reduced when the system is provided.

Another advantage of the above described system is that the weight of steel required to construct a self-trimming dry bulk carrier of the same dimensions and having the same basic design characteristics, including the quantity of water ballast tankage, is reduced by being able to construct the upper wing tanks of rectangular shape, whereby the usable cargo cubic within the holds of single deck and tween-deck vessels is increased.

The embodiments of the invention in which an exclusive property or privilege is claimed are defined as follows:

1. In a cargo carrying vessel particularly adapted to carry free-flowing cargoes, the combination of a hull, decks including an upper deck coacting with said hull to define cargo holds, vertical walls extending through said decks and defining loading hatches for said holds, said walls projecting above said upper deck and constituting hatch coamings, and a series of open-ended cargo trimming pipes slanting downwardly and outwardly from said hatch walls to said decks and communicating with said holds at points spaced outwardly from said walls, whereby free-flowing cargo deposited through said hatches into said holds may also flow through said pipes for trimming of the cargo in regions of the holds remote from the hatches.

2. A cargo carrying vessel as set forth in claim 1 together with wing tanks provided under said upper deck outside of said loading hatches, said hatch walls constituting the inner walls of said wing tanks and said cargo trimming pipes extending through said tanks.

3. A cargo carrying vessel as set forth in claim 1 in which said cargo trimming pipes constitute structural support members between the upper deck of the vessel and said coaming.

4. A cargo carrying vessel as set forth in claim 2 in which that portion of the cargo trimming pipes within the wing tanks is removable.

5. A cargo carrying vessel as set forth in claim 1 in which the said cargo trimming pipes are set at an angle of not less than 30° from the horizontal.

6. A cargo carrying vessel as set forth in claim 2 in which said cargo trimming pipes are set at an angle of not less than 30° from the horizontal, and that portion of the trimming pipes located within the wing tanks of the vessel has one or more cargo feeding branches extending through the bottom of the wing tanks.

7. A cargo carrying vessel as set forth in claim 2 in which said upper wing tanks have a rectangular configuration.

8. A cargo carrying vessel as set forth in claim 1 together with removable closures provided at the open end of said cargo trimming pipes at said hatch walls.

9. A cargo carrying vessel as set forth in claim 4 together with securing flanges provided on end portions of said cargo trimming pipes which are located within said wing tanks, and removable closures sealing openings in the vessel when portions of the trimming pipes within the wing tanks are removed.

10. A cargo carrying vessel as set forth in claim 2 together with a longitudinal bulkhead dividing said wing tanks into two separate compartments, said cargo trimming pipes extending through said bulkheads to points remote from the loading hatches.

11. A cargo carrying vessel as set forth in claim 2 together with vertical stand pipes extending through said wing tanks adjacent the lower ends of said trimming pipes within the wing tanks, said stand pipes having open lower ends open to the cargo holds and open upper ends above said upper deck, and portable sighting means insertable through said stand pipes for sighting loading of cargo within the holds remote from the loading hatches.

* * * * *